United States Patent
Wittberg et al.

(10) Patent No.: US 12,284,547 B2
(45) Date of Patent: Apr. 22, 2025

(54) METHODS FOR BUFFER STATUS REPORTING IN MULTIPLE CONNECTIVITY AND RELATED APPARATUS

(71) Applicant: Telefonaktiebolaget LM Ericsson (publ), Stockholm (SE)

(72) Inventors: Mikael Wittberg, Uppsala (SE); Akram Bin Sediq, Kanata (CA); Gary Boudreau, Kanata (CA); Martin Skarve, Enebyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 345 days.

(21) Appl. No.: 17/770,777

(22) PCT Filed: Oct. 23, 2019

(86) PCT No.: PCT/IB2019/059083
§ 371 (c)(1),
(2) Date: Apr. 21, 2022

(87) PCT Pub. No.: WO2021/079174
PCT Pub. Date: Apr. 29, 2021

(65) Prior Publication Data
US 2022/0417789 A1    Dec. 29, 2022

(51) Int. Cl.
*H04W 28/02* (2009.01)
*H04W 28/086* (2023.01)
(Continued)

(52) U.S. Cl.
CPC ... *H04W 28/0278* (2013.01); *H04W 28/0862* (2023.05); *H04W 72/21* (2023.01); *H04W 76/15* (2018.02)

(58) Field of Classification Search
CPC . H04W 28/0278; H04W 76/15; H04W 72/21; H04W 28/0862; H04W 28/0858;
(Continued)

(56) References Cited

U.S. PATENT DOCUMENTS 9,635,655 B2 * 4/2017 Jha ............... H04W 28/0205
10,085,254 B2 * 9/2018 Yi ................ H04W 28/0278
(Continued)

FOREIGN PATENT DOCUMENTS

| WO | 2014183664 A1 | 11/2014 |
| WO | 2015062085 A1 | 5/2015 |
| WO | 2015139764 A1 | 9/2015 |

OTHER PUBLICATIONS

International Search Report and Written Opinion dated Jun. 18, 2020 for International Application No. PCT/IB2019/059083 filed Oct. 23, 2019, consisting of 12-pages.
(Continued)

*Primary Examiner* — Mandish K Randhawa
(74) *Attorney, Agent, or Firm* — Weisberg I.P. Law, P.A.

(57) ABSTRACT

A method performed by a user device having a multiple connectivity configuration with a plurality of radio links to a plurality of network nodes in a radio communication network is provided. The user device can determine a change occurred in an amount of uplink data available for transmission in a first uplink buffer of the user device on a first radio link of a plurality of radio link to first network node. Responsive to the change, the user device can trigger a buffer status report for transmission to a second network node of the plurality of network nodes on a second radio link of the plurality of radio links for which a change in an amount of uplink data available for transmission in a second uplink buffer was not determined. A method performed by the first network node is also provided.

4 Claims, 6 Drawing Sheets

(51) Int. Cl.
*H04W 72/21* (2023.01)
*H04W 76/15* (2018.01)

(58) Field of Classification Search
CPC ......... H04W 28/0933; H04W 28/0812; H04W 28/0967; H04W 28/082; H04W 28/0983
See application file for complete search history.

(56) References Cited

U.S. PATENT DOCUMENTS

| | | | | |
|---|---|---|---|---|
| 2010/0284314 | A1* | 11/2010 | Pelletier | H04L 47/30 375/295 |
| 2013/0294337 | A1* | 11/2013 | Damnjanovic | G06F 17/12 370/328 |
| 2015/0117241 | A1* | 4/2015 | Koc | H04W 4/02 370/252 |
| 2016/0044734 | A1 | 2/2016 | Park et al. | |
| 2016/0286429 | A1* | 9/2016 | Chen | H04W 28/0933 |
| 2016/0295442 | A1* | 10/2016 | Virtej | H04W 72/21 |
| 2017/0111818 | A1* | 4/2017 | Sebire | H04L 5/00 |
| 2018/0227941 | A1* | 8/2018 | Zhang | H04W 72/21 |
| 2020/0374888 | A1* | 11/2020 | Fan | H04W 80/02 |

OTHER PUBLICATIONS

3GPP TS 36.321 V15.7.0; 3rd Generation Partnership Project; Technical Specification Group Radio Access Network; Evolved Universal Terrestrial Radio Access (E-UTRA); Medium Access Control (MAC) protocol specification (Release 15), Sep. 2019, consisting of 134-pages.
3GPP TS 36.322 V15.3.0; 3rd Generation Partnership Project; Technical Specification Group Radio Access Network; Evolved Universal Terrestrial Radio Access (E-UTRA); Radio Link Control (RLC) protocol specification (Release 15), Sep. 2019, consisting of 47-pages.
3GPP TS 38.321 V15.7.0; 3rd Generation Partnership Project; Technical Specification Group Radio Access Network; NR; Medium Access Control (MAC) protocol specification (Release 15), Sep. 2019, consisting of 78-pages.
3GPP TS 38.322 V15.5.0; 3rd Generation Partnership Project; Technical Specification Group Radio Access Network; NR; Radio Link Control (RLC) protocol specification (Release 15), Mar. 2019, consisting of 33-pages.
3GPP TS 38.323 V15.6.0; 3rd Generation Partnership Project; Technical Specification Group Radio Access Network; NR; Packet Data Convergence Protocol (PDCP) specification (Release 15), Jun. 2019, consisting of 26-pages.
3GPP TS 38.425 V15.6.0; 3rd Generation Partnership Project; Technical Specification Group Radio Access Network; NG-RAN; NR user plane protocol (Release 15), Jul. 2019, consisting of 22-pages.

* cited by examiner

METHODS FOR BUFFER STATUS REPORTING IN MULTIPLE CONNECTIVITY AND RELATED APPARATUS

TECHNICAL FIELD

The present disclosure relates generally to buffer status reporting for a user device having a multiple connectivity configuration with a plurality of radio links in a radio communication network.

BACKGROUND

A user device (UD) in Long Term Evolution (LTE) or new radio (NR) may use buffer status reporting to report how much data the UD has available for transmission. The buffer status (BS) may be reported in a buffer status report (BSR) medium access control (MAC) control element. The uplink (UL) data volume may be reported per Logical Channel Group (LCG) where there can be a number of logical channels in each LCG.

The total UL buffer that the UD may report to the network may include the data stored on the radio link control (RLC) layer and on the packet data convergence protocol (PDCP) layer.

In some cases (as explained further below), a UD may send a Scheduling Request (SR) to request UL scheduling resources when it needs to send a BSR. A SR is described in section 5.4.4 in 3GPP Technical Specification (TS) 36.321 NR, Medium Access Control (MAC) protocol specification (LTE) (TS 36.321 (LTE)) and 3GPP TS 38.321 E-UTRA, Medium Access Control (MAC) protocol specification (NR) (TS 38.321 (NR)) (collectively referred to herein as MAC specifications).

There may be a number of trigger conditions for when a BSR is sent by the UD to the network. Some trigger conditions are described in section 5.4.5 in 3GPP TS 36.321 (LTE) and 3GPP TS 38.321 (NR) MAC specifications. These trigger conditions may include the following cases:
  If new UL data becomes available for a logical channel within a LCG for which there was no data available before for any other logical channels within the same LCG, or if new data becomes available for a logical channel within the LCG that has higher priority than any logical channel within the LCG for which data is available. This type of BSR is called a Regular BSR and, for this case, the UD will send a SR if the UD does not have an UL grant in which the BSR can be sent.
  If there is a sufficient number of paddings in a MAC protocol data unit (PDU) where a BSR can be included. This type of BSR is called a Padding BSR.
  Periodically when there is UL data available in a logical channel for an LCG and, in which case, a SR will be sent if the UD does not have an UL grant in which the BSR can be sent. This may be controlled by a timer, e.g. a retxBSR-Timer.
  Periodically whenever the UD has an UL grant for which it can send the BSR. In this case, the UD will not send an SR if the UD does not have an UL grant. This case may be controlled by a periodic timer, e.g. a periodicBSR-Timer.

The following explanation of potential problems is a present realization as part of the present disclosure and is not to be construed as previously known by others. Some BSR approaches may not work in an optimal or efficient way for a UD having a multiple connectivity configuration with a plurality of radio links to a plurality of network nodes. Thus, improved BSR processes may achieve improved or optimized BSR for a multiple connectivity configuration.

SUMMARY

According to some embodiments, a method performed by a user device having a multiple connectivity configuration with a plurality of radio links to a plurality of network nodes in a radio communication network is provided. The user device can determine a change occurred in an amount of uplink data available for transmission in a first uplink buffer of the user device on a first radio link of a plurality of radio links. Each of the plurality of radio links of the user device can include an uplink buffer. The first radio link can include a first network node of the plurality of network nodes. Responsive to the change, the user device can trigger a buffer status report for transmission to a second network node of the plurality of network nodes on a second radio link of the plurality of radio links for which a change in an amount of uplink data available for transmission in a second uplink buffer was not determined.

According to some embodiments, a computer program can be provided that includes instructions which, when executed on at least one processor, cause the at least one processor to carry out methods performed by the user device.

According to some embodiments, a computer program product can be provided that includes a non-transitory computer readable medium storing instructions that, when executed on at least one processor, cause the at least one processor to carry out methods performed by the user device.

According to some embodiments, a user device configured to operate having a multiple connectivity configuration with a plurality of radio links to a plurality of network nodes in a radio communication network is provided. The user device can include at least one processor. The user device can further include a memory coupled with the at least one processor. The memory can include instructions that when executed by the at least one processor causes the user device to perform operations. The operations can include determining a change occurred in an amount of uplink data available for transmission in a first uplink buffer of the user device on a first radio link of a plurality of radio link. Each of the plurality of radio links of the user device can include an uplink buffer. The first radio link can include a first network node of the plurality of network nodes. Responsive to the change, the operation can further include triggering a buffer status report for transmission to a second network node of the plurality of network nodes on a second radio link of the plurality of radio links for which a change in an amount of uplink data available for transmission in a second uplink buffer was not determined.

According to some embodiments, a method performed by a first network node connected to a user device having a multiple connectivity configuration with a plurality of radio links to a plurality of network nodes in a radio communication network is provided. The first network node can receive a buffer status report from the user device. The buffer status report can include an uplink data amount available for transmission in the user device. The operations can further include receiving uplink data from the user device on a first radio link of the plurality of radio links of the user device. The operations can further include tracking the amount of uplink data received from the user device on the first radio link of the plurality of radio links of the user device. The operations can further include exchanging information with each of the other of the plurality of network nodes of the amount of uplink data received by each of the other of the plurality of network nodes on each of the other plurality of radio links from the user device. The operations can further include calculating a total remaining data amount in the user device based on the exchanged information. The operations can further include adapting an uplink resource grant based on the calculation.

According to some embodiments, a computer program can be provided that includes instructions which, when executed on at least one processor, cause the at least one processor to carry out methods performed by the first network node.

According to some embodiments, a computer program product can be provided that includes a non-transitory computer readable medium storing instructions that, when executed on at least one processor, cause the at least one processor to carry out methods performed by the first network node.

According to some embodiments, a first network node configured to operate with a user device having a multiple connectivity configuration with a plurality of radio links to a plurality of network nodes in a radio communication network is provided. The first network node can include at least one processor. The first network node can further include a memory coupled with the at least one processor. The memory can include instructions that when executed by the at least one processor causes the first network node to perform operations. The operations can include receiving a buffer status report from the user device. The buffer status report can include an uplink data amount available for transmission in the user device. The operations can further include receiving uplink data from the user device on a first radio link of the plurality of radio links of the user device. The operations can further include tracking the amount of uplink data received from the user device on the first radio link of the plurality of radio links of the user device. The operations can further include exchanging information with each of the other of the plurality of network nodes of the amount of uplink data received by each of the other of the plurality of network nodes on each of the other plurality of radio links from the user device. The operations can further include calculating a total remaining data amount in the user device based on the exchanged information. The operations can further include adapting an uplink resource grant based on the calculation.

Other systems, computer program products, and methods according to embodiments will be or become apparent to one with skill in the art upon review of the following drawings and detailed description. It is intended that all such additional systems, computer program products, and methods be included within this description and protected by the accompanying claims.

Operational advantages that may be provided by one or more embodiments may include improving or optimizing UL scheduling of a BSR to network nodes within a multiple connectivity configuration with a UD Improving BSR scheduling in a multiple connectivity configuration may lead to improved system performance and improved use of UL resources.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Various embodiments will be described more fully hereinafter with reference to the accompanying drawings. Other embodiments may take many different forms and should not be construed as limited to the embodiments set forth herein; rather, these embodiments are provided by way of example to convey the scope of the subject matter to those skilled in the art. Like numbers refer to like elements throughout the detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In case of multiple connectivity, there are multiple connected radio paths for which data may be transmitted. For example, FIG. 1 illustrates an example of multiple connectivity in the form of dual connectivity (DC) where there are two connected radio paths 103a, 103b for which data may be transmitted in accordance with some embodiments of the present disclosure.

Figure 1:
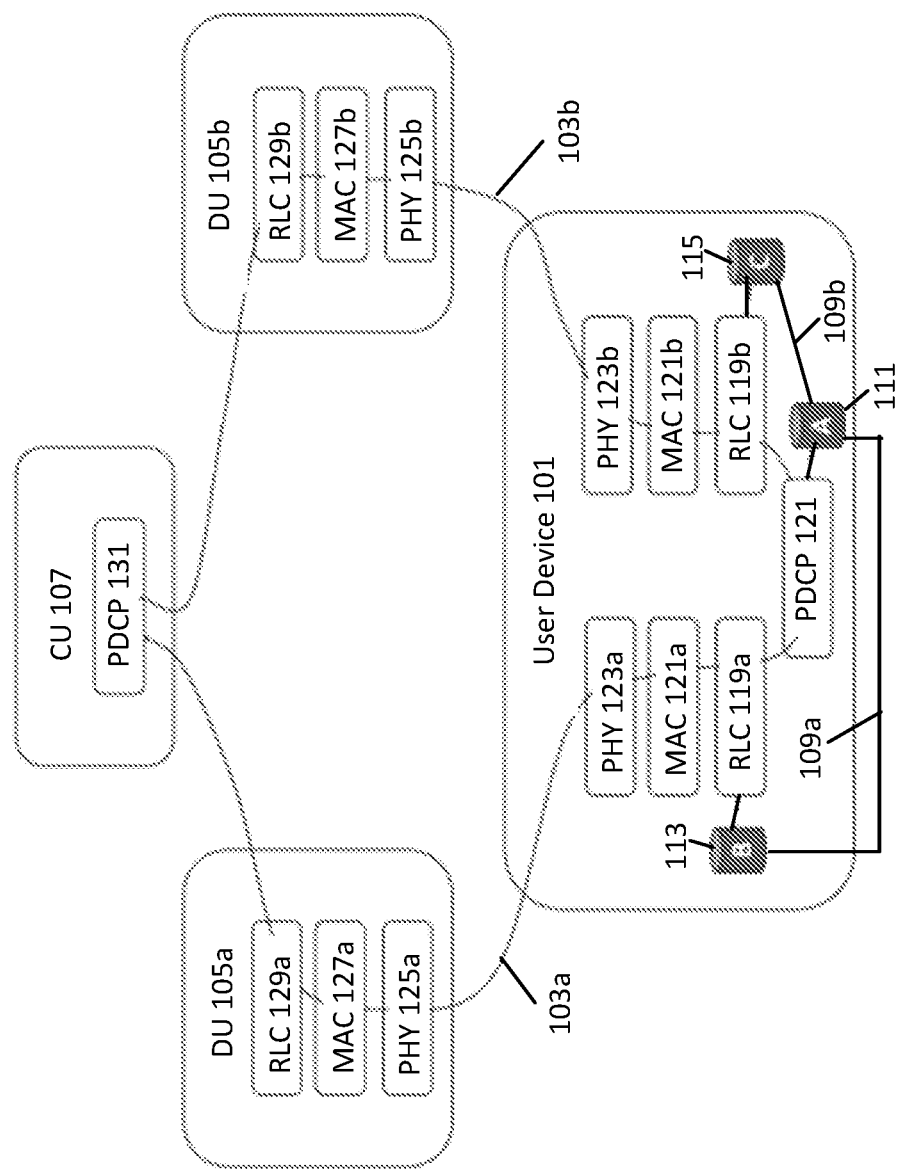
FIG. 1 is a block diagram illustrating a multiple connectivity configuration in the form of dual connectivity according to some embodiments of the present disclosure.

One example of DC is the Evolved Universal Mobile Telecommunications Systems Radio Access Network (E-UTRAN) New Radio-Dual Connectivity (EN-DC) deployment illustrated in FIG. 1. In EN-DC, one Distributed Unit (DU) 105a is an eNode B (eNB) and the other DU is a gNodeB (gNB) 105b. In EN-DC, UD 101 has one MAC layer (e.g., 127a or 127b, respectively) per connected radio link (e.g., 103a or 103b, respectively), but there is one common PDCP layer 121 for all connected radio links (e.g., 103a, 103b). The term "radio link" herein may be used interchangeably with the terms "leg" or "radio path". In EN-DC, UD 101 also has one RLC buffer (e.g., 119a or 119*b*, respectively) per connected radio link (e.g., 103*a* or 103*b*, respectively), but there is one common PDCP buffer 111 for all connected radio links (e.g., 103*a*, 103*b*).

In some embodiments, referring to FIG. 1, UD 101 is shown having a dual connectivity configuration where there are two connected radio paths 103*a*, 103*b* for which data may be transmitted to each of two DUs 105*a*, 105*b*, and from DUs 105*a*, 105*b* to Central Unit (CU) 107. As illustrated in FIG. 1, the structure of the network nodes may be split into two parts, e.g. CU 107 and DUs 105*a* (eNB), 105*b* (gNB). The split may occur at layers in the protocol stack as shown in FIG. 1, with PDCP layer 131 at CU 107 and a RLC 129, MAC 127 and physical (PHY) 125 layer at each of DU 105*a* (eNB) and DU 105*b* (gNB). CU 107 may be located physically apart from each DU 105*a*, 105*b*. CU may be located, e.g., in a core network or between a DU and a core network. CU 107 can be further split into a CU-CP (control plane) entity and a CU-UP (user plane) entity (not shown).

Still referring to FIG. 1, UD 101 includes a plurality of buffers for UL 101 data, including one PDCP buffer 111 for the PDCP protocol layer, a first RLC buffer 113 for a first RLC layer 119*a*, a second RLC buffer 115 for a second RLC layer 119*b*, a first uplink buffer 109*a* (combining PDCP buffer 111 and first RLC buffer 113), and a second uplink buffer 109*b* (combining PDCP buffer 111 and second RLC buffer 115). Note that within a RLC protocol layer there may be many RLC bearer instances, one RLC bearer instance per radio bearer, and the RLC buffer (e.g., 113, 115) for an RLC protocol layer (e.g., 119*a*, 119*b*) is the sum of the buffered data for all RLC bearer instances. Each uplink buffer (109*a*, 109*b*) of UD 101 on each of the plurality of radio links 103 may include a RLC buffer (113, 115) associated with one of the plurality of radio links (e.g., RLC buffer 113 is associated with radio link 103*a*) and PDCP buffer 111 that is shared among the plurality of radio links 103 (e.g., PDCP buffer 111 is shared among radio links 103*a* and 103*b*).

In some embodiments, reporting of BSR may be done per MAC instance for a MAC layer 121 (e.g., 121*a*, 121*b*). In the calculation for the amount of UL data buffered per radio link (e.g., 103*a*, 103*b*), UD 101 may report the volumes for the radio links (e.g., 103*a*, 103*b*) shown in FIG. 1 as follows:

The volume of buffer 109*a* (PDCP buffer 111+RLC buffer 113) is reported by a first radio link (e.g., 103*a*); and/or
The volume of buffer 109*b* (PDCP buffer 111+RLC buffer 115) is reported by a second radio link (e.g., 103*b*).

3GPP TS 38.323 NR, Packet Data Convergence Protocol (PDCP) specification (3GPP TS 38.323) describes that one of the two radio links (where each radio link includes a MAC entity) in DC is a primary path. The primary path is used for UL transmission when the UD only schedules data on one of the two MAC entities.

According to the 3GPP TS 38.323, it also may be possible to specify a threshold for the UL data buffer, called ul-DataSplitThreshold. This threshold may be used in such a way that if the UL data buffer volume is below the configured threshold for the non-primary radio link, the UD may indicate that the UL data buffer volume for this radio link is zero.

In the 3GPP Technical Specification 36.321 (LTE) and 38.321 (NR), BSR is handled based on a network at certain intervals getting a BSR which contains the current UL buffer level of the UD.

In some approaches, until the next BSR report which the network receives, the network can calculate how much data is left in the UL buffer by reducing the reported volume with the amount of data that has been scheduled in UL since the last BSR report. By using this approach, the network may estimate the level of the UL buffer of the UD. This handling also means that the network may, at any time, provide optimal or appropriate grant sizes for the UD. Thus, the network may provide as large a grant as needed but there is no need to provide a grant that is much larger than the estimated UL buffer level.

A potential problem with such a BSR process may be that the process may not work well, or in an optimal way, for a multiple connectivity configuration. For example, in case of DC, the UL buffer level may be reduced due to scheduling performed in the second radio link and, thus, it may not sufficient to only calculate the amount of UL data that is scheduled in the first radio link. Referring to FIG. 1, for example, the two MAC instances for each of two MAC layers (e.g., 127*a*, 127*b*) on the network side may be located in separate nodes (DU 105*a* and DU 105*b*). For a DC configuration, therefore, the two MAC instances may not easily coordinate the scheduling of the same UD 101. Thus, it may be difficult for one of the DUs 105*a* to know what the other DU 105*b* has scheduled.

In a multiple connectivity configuration, therefore, a first DU (e.g., 105*a*) may not know how much data UD 101 has stored in its UL buffer (e.g., 109*a*), since it also depends on the scheduling performed by the other DUs (e.g., 105*b*, 105*c*, etc.). Thus, the first DU (e.g., 105*a*) may not be able to optimize or provide appropriate grants for its scheduling. Thus, there may be a risk that multiple large grants are given to UD 101 for UL data that the first DU (e.g., 105*a*) thinks UD 101 has, but which has actually already been scheduled on the other DUs (e.g., 105*b*, 105*c*, etc.). If one DU (e.g., 105*a*) tries to assume a certain scheduling rate by the other DUs (105*b*, 105*c*, etc.), there may be the opposite risk that a too small a grant is given for UD 101 when the other DUs (e.g., 105*b*, 105*c*, etc.) have not scheduled UD 101 within the last subframes.

Another potential problem with a multiple connectivity configuration as follows. UD 101 may move some of its UL data to a first RLC buffer (e.g., RLC buffer 113) to prepare for scheduling on a first radio link (e.g., radio link 103*a*), and a BSR may also be transmitted for the first radio link (e.g., radio link 103*a*) reporting this data volume. However, if, for example, the radio condition on the first radio link (e.g., radio link 103*a*) becomes bad or if the load becomes very large, there may be a need to move this UL data to another radio link (e.g., radio link 103*b*) where the radio condition or load may be much better. If UD 101 performs this move of the UL data, however, a new BSR may not be triggered according to the trigger conditions in TS 38.323. In this example, one of the DUs (DU 105*a*) thinks UD 101 has a lot of data when it has very little data, and the other DU (DU 015*b*) thinks UD 101 has very little data when it has a lot of data. A situation like this example, therefore, may also lead to sub-optimal scheduling.

Yet another potential problem with the approach of TS 38.323 may be that if the UL data volume in a non-primary radio link (e.g., radio link 103*b*) becomes lower than the ul-DataSplitThreshold, a data volume of zero bytes may be reported on the non-primary radio link. Under the approach of TS 38.323, this will not trigger a BSR on the primary radio link (e.g., radio link 103*a*). Triggering a BSR on the primary radio link (e.g., radio link 103*a*) may enable more optimal or appropriate scheduling in the primary radio link because the UL data that is currently stored on the RLC layer (e.g., RLC layer 119*b*) of the non-primary radio link (e.g., radio link 103*b*) may now be moved by UD 101 to either the PDCP layer 121 or to the RLC layer (e.g., 119a) of the primary radio link (e.g., 103a), and hence should be included in a new BSR.

Certain aspects of the present disclosure and their embodiments may provide solutions to these and/or other challenges.

In various embodiments, a method may be provided to optimize or improve UL scheduling for a multiple connectivity configuration based on a change in the amount of UL buffer on one radio link of the multiple radio links. The change in the amount of UL buffer in one radio link of the multiple radio links may trigger a BSR to be sent on another radio link of the multiple radio links.

Figure 2:
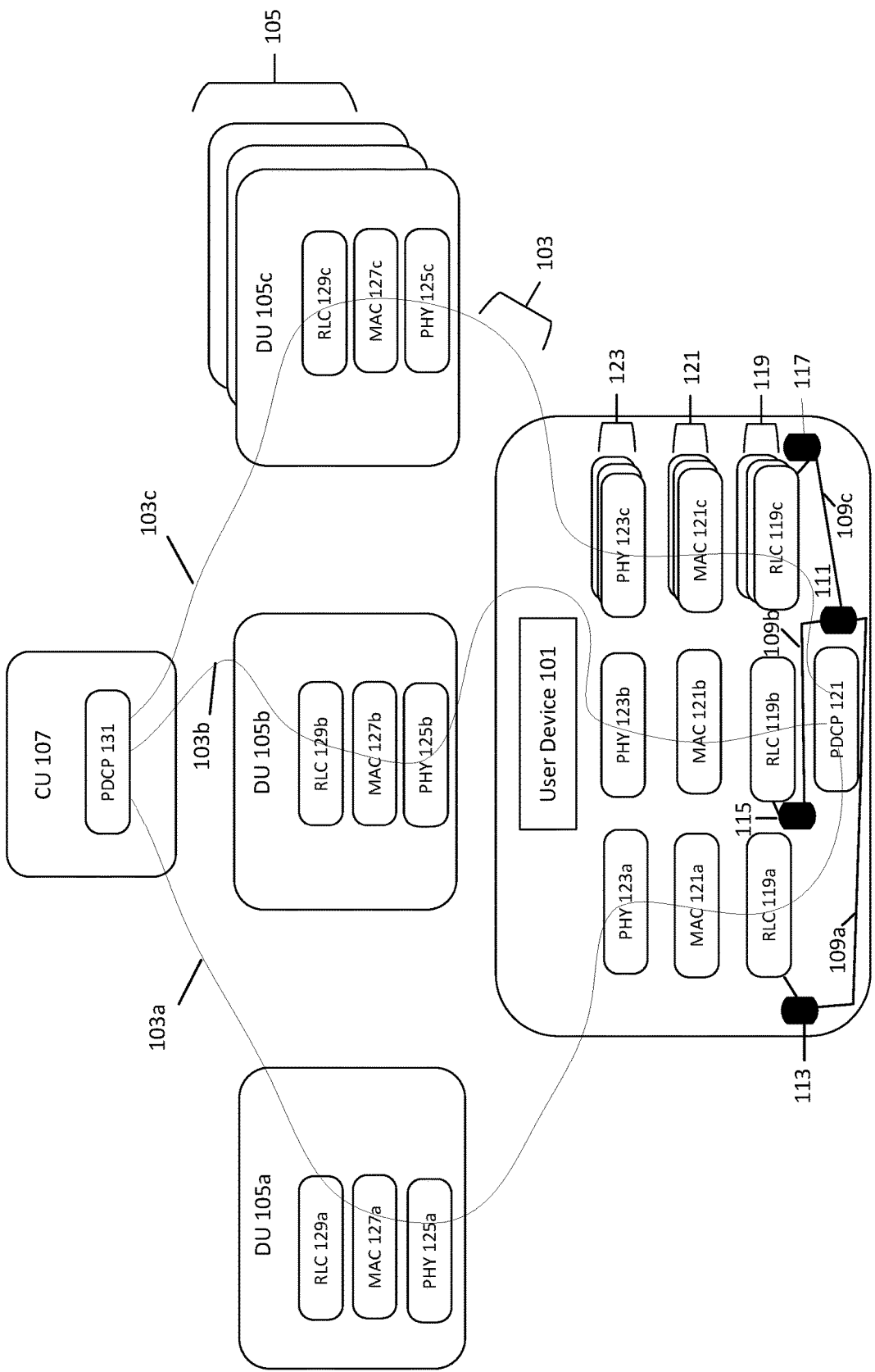
FIG. 2 is a block diagram illustrating a further example of a multiple connectivity configuration according to some embodiments of the present disclosure.

While various embodiments are described with reference to a DC configuration, the invention is not so limited, and includes multiple connectivity configurations of any number (e.g., two or more connected radio paths for which data may be transmitted) as illustrated in FIG. 2.

Referring to FIG. 2, FIG. 2 illustrates another example of multiple connectivity where there is a plurality of connected radio paths 103 for which data may be transmitted in accordance with some embodiments of the present disclosure.

In the example of FIG. 2, one Distributed Unit (DU) 105a may be an eNode B (eNB) and two additional DUs each may be a gNodeB (gNB) 105b, 105c. In this exemplary configuration, UD 101 has one MAC layer (MAC layers 121a, 121b, and 121c, respectively) per connected radio link (103a, 103b, and 103c respectively)), but there is one common PDCP layer 121 for all connected radio links 103a, 103b, 103c, etc. FIG. 2 further illustrates that UD 101 also has one RLC buffer (e.g., 119a, 119b, 119c, etc. respectively) per connected radio link (e.g., 103a, 103b, 103c, etc. respectively), but there is one common PDCP buffer 111 for all connected radio links (e.g., 103a, 103b, 103c, etc.).

In various embodiments, referring to FIG. 2, UD 101 has a multiple connectivity configuration where there is a plurality of connected radio paths 103 (e.g., radio paths 103a, 103b, 103c) for which data may be transmitted to a plurality of DUs 105 (e.g., DUs 105a, 105b, 105c), and from the plurality of DUs 105 (e.g., DUs 105a, 105b, 105c) to a Central Unit (CU) 107. UD 101 may include a plurality of buffers for UL data including, for example, one PDCP buffer 111 for PDCP protocol layer 121; a plurality of RLC buffers 119 (e.g., first RLC buffer 113 for a first RLC layer 119a, a second RLC buffer 115 for a second RLC layer 119b, and a third RLC buffer 117 for a third RLC layer 119c); and a plurality of uplink buffers 109 (e.g., a first uplink buffer 109a (combining PDCP buffer 111 and first RLC buffer 113), a second uplink buffer 109b (combining PDCP buffer 111 and second RLC buffer 115), and a third uplink buffer (combining PDCP buffer 111 and a third RLC buffer 117). Note that within a RLC protocol layer 119 there may be many RLC bearer instances, one RLC bearer instance per radio bearer, and the RLC buffer (e.g., RLC buffers 113, 115, and 117, respectively) for a given RLC protocol layer 119 (e.g., RLC protocol layers 119a, 119b, and 119c, respectively) is the sum of the buffered data for all RLC bearer instances.

Still referring to FIG. 2, in various embodiments, reporting of BSR may be done per MAC instance (e.g., for each of MAC layer 119a, 119b, and/or 119c, respectively). In the calculation for the amount of UL data buffered per radio link 103 (e.g., 103a, 103b, and 103c, respectively), UD 101 may report volumes for the plurality of radio links 103 as shown below:

The volume of uplink buffer 109a (PDCP buffer 111+RLC buffer 113) is reported by a first radio link 103a;

The volume of uplink buffer 109b (PDCP buffer 111+RLC buffer 115) is reported by a second radio link 103b;

The volume of uplink buffer 109c (PDCP buffer 111+RLC buffer 117) is reported by a third radio link 103c; and/or The volume of each of any additional uplink buffers 109 is reported by each corresponding radio link 103 in a similar manner (that is, for multiple connectivity configurations have more than three connected radio paths for which data may be transmitted).

Presently disclosed embodiments may provide potential advantages. One potential advantage may provide the base stations (e.g., the DUs 105) within a multiple connectivity configuration to optimize or improve their UL scheduling based on a change in the amount of UL buffer on one or more of the multiple radio links. For example, UL grants may be tuned to what is needed and may avoid scheduling UD 101 with a large grant when UD 101 has no more data to send; and may avoid scheduling UD 101 with a grant that is too small when a larger grant may be better.

In various embodiments, a change in the amount of UL buffer can happen due to scheduling by the network, or due to actions performed by UD 101, such as moving some of the UL data in an RLC buffer (e.g., RLC buffer 113) to another of the plurality of radio links 103 (e.g., radio link 103b and/or radio link 103c, etc.).

In various embodiments, a BSR may be triggered as a regular BSR or the BSR may be triggered as a periodic BSR. For a regular BSR, a scheduling request (SR) may be sent when UD 101 does not have UL resources. For a periodic BSR, a SR may not be sent when UD 101 does not have UL resources.

In some embodiments, if data is pushed from a PDCP 121 layer to a RLC layer 119 by a first of the radio links (e.g., 103a) in a multiple connectivity configuration (e.g., a change in the UL data volume of a second radio link 103b), UD 101 will trigger a BSR to be sent on another of the multiple radio links (e.g., second radio link 103b in DC).

In some embodiments, if data is pushed from an RLC layer (e.g., 119) to a PDCP layer 121 by a first radio link (e.g., 103a) in a multiple connectivity configuration (e.g., a change in the UL data volume of a second radio link 103b), UD 101 will trigger a BSR to be sent on the another of the multiple radio links (e.g., second radio link 103b in DC).

In some embodiments, a change in the amount of UL data volume (e.g., that is sufficient to trigger a BSR) can be defined as the amount of data exceeding a threshold T1 defined as a percentage (e.g., proportion) of the data in UD 101 UL buffer. In some embodiments, a change in the amount of UL data volume (e.g., that is sufficient to trigger a BSR) can be defined as the amount of data exceeding a percentage change (above a threshold T2) of the data in UD 101 UL buffer. The threshold T1 (as well as T2) can be defined to be equal for each buffer (e.g., 109a, 109b, 109c, etc.) or defined independently for each of the UD 101 UL buffers (e.g., 109a, 109, 109c, etc.). Furthermore, setting of the thresholds T1 and T2 can be set based on the network node (e.g., DU 105) satisfying one of a number of different optimality criteria such as:

i. load balancing (i.e. use of equal thresholds between cells);

ii. maximizing throughput (i.e. use of a metric such signal to noise ratio (SNR) or signal to interference and noise ratio (SINR) metric in combination with a link adaptation setting). For example, if a high SNR or SINR is available, the link adaption may choose a modulation coding scheme (MCS) requiring a higher throughput which may lead to setting the threshold T1 to a higher value to ensure availability of data; and/or iii. minimizing interference to other users (i.e. use a metric such as SLNR). For example, reducing interference may result in reducing transmit power and the data rate, which would allow use of a lower threshold T1.

In some embodiments, a prohibit timer is applied on the minimum time between two consecutive BSR transmissions.

In some embodiments, a change in an amount of UL data on one radio link (e.g., radio link 103a) of the plurality of radio links 103 is considered to happen if UD 101 moves some of the data from an RLC buffer (e.g., RLC buffer 113) to another RLC buffer (e.g., RLC buffer 115) of the plurality of RLC buffers or to PDCP buffer 111.

In some embodiments, when a BSR is triggered due to conditions in other embodiments described herein, a regular BSR is triggered. Triggering of a regular BSR means that a SR will also be triggered if UD 101 has no UL resources on the radio link (e.g., radio link 103a) for which the BSR is triggered.

In some embodiments, when a BSR is triggered due to conditions in other embodiments described herein, a BSR is triggered as a periodic BSR. Triggering of a periodic BSR means that no SR will be triggered if UD 101 has no UL resources on the radio link 103 (e.g., radio link 103a) for which the BSR was triggered.

In some embodiments, other embodiments described herein may be deactivated when only one leg (e.g., leg 103a) is used for transmission (e.g., when the total volume of the UL data buffer (e.g., UL data buffer 109b) for the non-primary radio link (e.g., radio link 103b) becomes lower than the ul-DataSplitThreshold (that is, the amount of PDCP data volume and RLC data volume pending for initial transmission, as specified in Technical Specification 38.322 E-UTRA, Radio Link Control (RLC) protocol specification.

In some embodiments, when the total volume of the UL data buffer (e.g., uplink buffer 109b) for the non-primary radio link (e.g., radio link 103b) becomes lower than the ul-DataSplitThreshold, this will trigger a BSR on the primary radio link (e.g., radio link 103a).

In various embodiments, a plurality of radio links 103 (where each radio link 103 includes a MAC entity 127) within one multiple connectivity connection will, on the network side, exchange information of received BSRs and received data volume for each radio link 103 with each other. Each of the network MAC entities 127 can then estimate the actual value of outstanding data volume per radio link even when no or limited BSRs are received over one of the plurality of radio links 103 from UD 101.

For example: each MAC entity 127 may receive initially a BSR including current data volume value in UD 101. After receiving these BSRs, each MAC entity 127 (e.g., MAC entity 127a) may maintain knowledge about received data volume for its radio link (e.g., 103a) and then may receive information of received data volume from another leg (e.g., leg 103b). Based on the received data volume, each MAC entity (e.g., 127a, 127b, 127c, etc.) can then estimate the total remaining data volume in UD 101 and, therefore, adapt its grants accordingly. Any received additional BSR may serve as a synchronization of data volume remaining. Synchronization of data volume remaining in UD 101 may be performed based on the network calculating how much data is left in the total remaining data volume in UD 101 by reducing the reported data volume in UD 101 from the initial BSR with the amount of data that has been scheduled in UL on each radio link (e.g., leg 103a and/or leg 103b) since the last BSR report.

In various embodiments, the information about received UL data volume per radio link is exchanged using the X2 protocol, specified in 3GPP Technical Specification 38.425 NG-RAN, NR user plane protocol.

Figure 3:
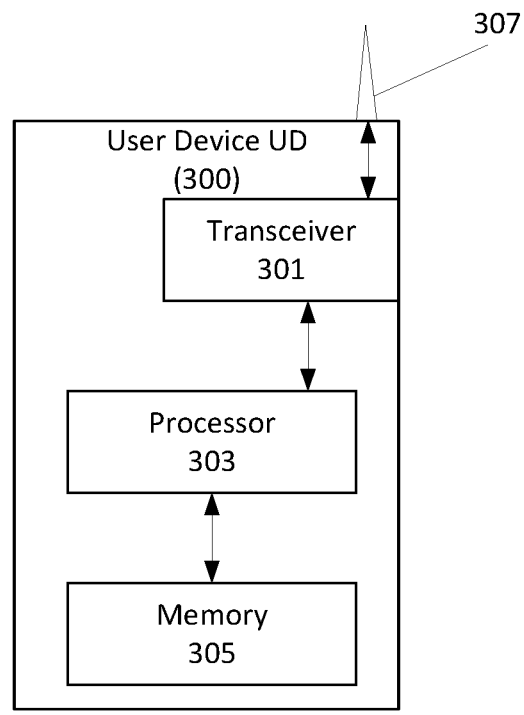
FIG. 3 is a block diagram illustrating a user device according to some embodiments of the present disclosure.

FIG. 3 is a block diagram illustrating a user device UD according to some embodiments of inventive concepts. A user device (UD) may be implemented using the structure of UD 300 from FIG. 3 with instructions stored in device readable medium (also referred to as memory) 305 of UD 300 so that when instructions of memory 305 of UD 300 are executed by at least one processor (also referred to as processing circuitry) 303 of UD 300, at least one processor 303 of UD 300 performs respective operations discussed herein. Processing circuitry 303 of UD 300 may thus transmit and/or receive communications to/from one or more other UDs and/or network nodes/entities/servers of a radio communication network through antenna 307 of UD 300. In addition, processing circuitry 303 of UD 300 may transmit and/or receive communications to/from one or more UDs and/or network nodes/entities/servers of a radio communication network through transceiver 301 of UD 300.

As used herein, UD refers to a device capable, configured, arranged and/or operable to communicate wirelessly with network nodes and/or other wireless devices. Unless otherwise noted, the term UD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a UD may be configured to transmit and/or receive information without direct human interaction. For instance, a UD may be designed to transmit information to a network on a predetermined schedule, when triggered by an internal or external event, or in response to requests from the radio communication network. Examples of a UD include, but are not limited to, a smart phone, a mobile phone, a cell phone, a voice over IP (VoIP) phone, a wireless local loop phone, a desktop computer, a personal digital assistant (PDA), a wireless camera, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A UD may support device-to-device (D2D) communication, for example by implementing a 3GPP standard for sidelink communication, and may in this case be referred to as a D2D communication device. As yet another specific example, in an Internet of Things (IoT) scenario, a UD may represent a machine or other device that performs monitoring and/or measurements, and transmits the results of such monitoring and/or measurements to another UD and/or a network node. The UD may in this case be a machine-to-machine (M2M) device, which may in a 3GPP context be referred to as a machine-type communication (MTC) device. As one particular example, the UD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UD may represent a vehicle or other equipment that is capable of monitoring and/or reporting on its operational status or other functions associated with its operation. A UD as described above may represent the endpoint of a wireless connection, in which case the device may be referred to as a wireless terminal. Furthermore, a UD as described above may be mobile, in which case it may also be referred to as a mobile device or a mobile terminal.

As used herein, network node refers to equipment capable, configured, arranged and/or operable to communicate directly or indirectly with a user device and/or with other network nodes or equipment in the radio communication network to enable and/or provide wireless access to the user device and/or to perform other functions (e.g., administration) in the radio communication network. Examples of network nodes include, but are not limited to, access points (APs) (e.g., radio access points), base stations (BSs) (e.g., radio base stations, Node Bs, evolved Node Bs (eNBs), gNode Bs (including, e.g., CU 107 and DUs 105 of a gNode B (gNB), etc.). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node. More generally, however, network nodes may represent any suitable device (or group of devices) capable, configured, arranged, and/or operable to enable and/or provide a user device with access to the radio communication network or to provide some service to a user device that has accessed the radio communication network.

Figure 4:
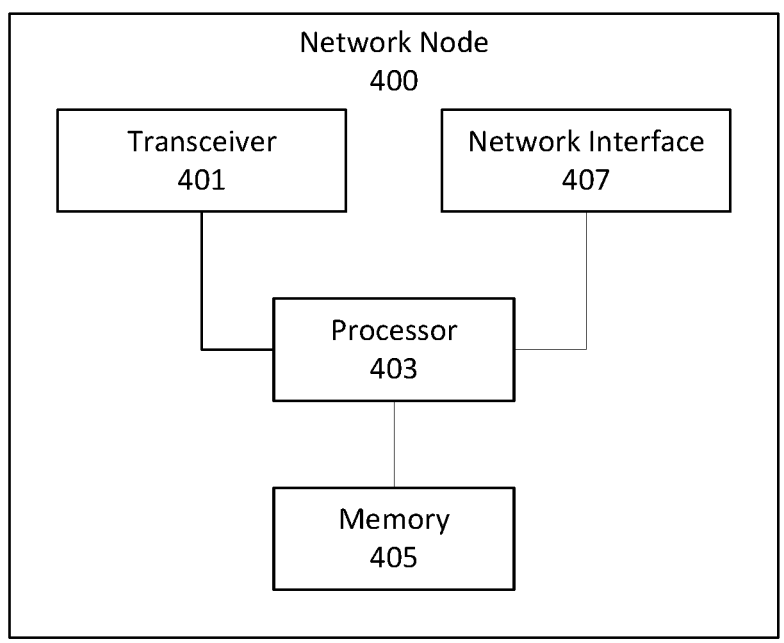
FIG. 4 is a block diagram illustrating a network node according to some embodiments of the present disclosure.

FIG. 4 is a block diagram illustrating a network node 400 according to some embodiments of inventive concepts. Network node 400 may be implemented using structure of network node 400 from FIG. 4 with instructions stored in device readable medium (also referred to as memory) 405 of network node 400 so that when instructions of memory 405 of network node 400 are executed by at least one processor (also referred to as processing circuitry) 403 of network node 400, at least one processor 403 of network node 403 performs respective operations discussed herein. Processing circuitry 403 of network node 400 may thus transmit and/or receive communications to/from one or more other network nodes/entities/servers of a radio communication network through network interface 407 of network node 400. In addition, processing circuitry 403 of network node 400 may transmit and/or receive communications to/from one or more wireless devices (e.g., user device (UD) 300) through interface 401 of network node 400 (e.g., using transceiver 401).

These and other related operations will now be described in the context of the operational flowcharts of FIGS. 5-10 of operations that may be performed by a UD (e.g., UD 300) according to various embodiments of inventive concepts. Each of the operations described in FIGS. 5-10 can be combined and/or omitted in any combination with each other, and it is contemplated that all such combinations fall within the spirit and scope of this disclosure.

Figure 5:
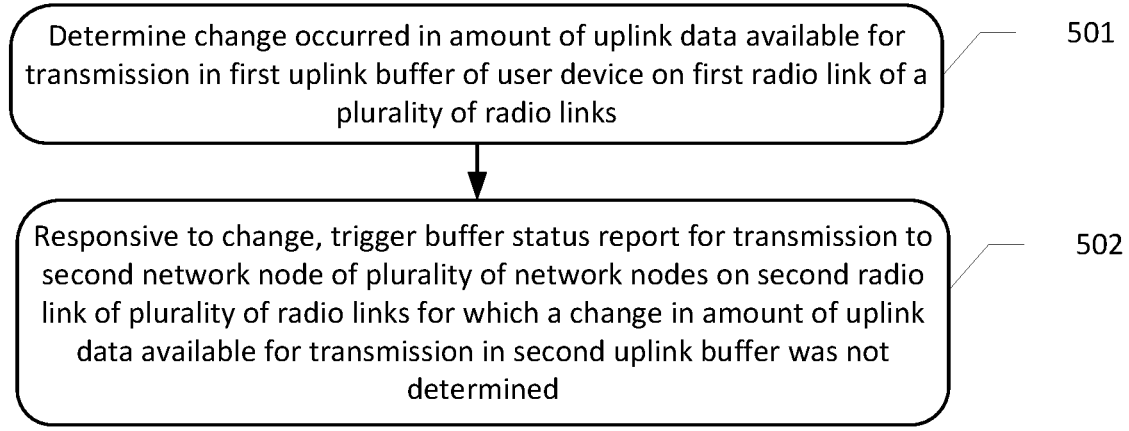
FIGS. 5-10 are flowcharts illustrating operations that may be performed by a user device in accordance with some embodiments of the present disclosure.

Referring initially to FIG. 5, operations can be performed by a UD (e.g., 300 in FIG. 3) having a multiple connectivity configuration with a plurality of radio links (e.g., 103) to a plurality of network nodes (e.g., 105) in a radio communication network. The operations of UD 300 include determining (501) a change occurred in an amount of uplink data available for transmission in a first uplink buffer (e.g., 109a) of the user device (e.g., 101) on a first radio link (e.g., 103a) of a plurality of radio links (e.g., 103). Each of the plurality of radio links (e.g., 103a, 103b, 103c, etc.) of the user device (e.g., 101) includes an uplink buffer (e.g., 109a, 109b, 109c). The first radio link includes a first network node (e.g., 105a) of the plurality of network nodes (e.g., 105). The operations of UD 300 further include, responsive to the change, triggering (502) a buffer status report for transmission to a second network node (e.g., 105b, 105c) of the plurality of network nodes (e.g., 105) on a second radio link (e.g., 103b, 103c) of the plurality of radio links (e.g., 103) for which a change in an amount of uplink data available for transmission in a second uplink buffer (e.g., 109b, 109c) was not determined.

In some embodiments, each uplink buffer (e.g., 109a, 109b, 109c, etc.) of the user device 101 on each of the plurality of radio links (e.g., 103a, 103b, 103c, etc.) includes a radio link control (RLC) buffer (e.g., 113, 115, 117) associated with one of the plurality of radio links (e.g., 103a, 103b, 103c) and a packet data convergence protocol (PDCP) buffer (e.g., 111) that is shared among the plurality of radio links (e.g., 103).

In some embodiments, the determining (501) a change occurred in the amount of uplink data available for transmission in a first uplink buffer of the user device on a first radio link of the plurality of radio links includes determining the change based on at least one or more of:

a scheduling of an uplink transmission of the user device by the radio communication network;

an action performed by the user device that changes the amount of uplink data available for transmission in the first uplink buffer (e.g., 109a) of the user device;

a push of data from a PDCP layer (e.g., 121) of the user device to a first RLC layer (e.g., 119a) of the user device;

a push of data from the first RLC layer (e.g., 119a) of the user device to the PDCP layer (e.g., 121) of the user device;

a change in an amount of data in the first uplink buffer (e.g., 109a) exceeding a first threshold defined as a percentage of an amount of data in the first uplink buffer of the user device;

a change in the amount of data in the first uplink buffer (e.g., 109a) exceeding a second threshold defined as a percentage change of an amount of data in the first uplink buffer of the user device;

the user device moving data from the first RLC buffer (e.g., 113) to a second RLC buffer (e.g., 115, 117) or to a PDCP buffer (111); and a total volume of the data in the first uplink buffer (e.g., 109a) of the user device is lower than a defined uplink data threshold.

In some embodiments, the first threshold and the second threshold is set based on one of the plurality of network nodes satisfying a criteria comprising one or more of:

a load balancing based on the first threshold and the second threshold having equal values between a plurality of cells;

a metric for improving throughput of data; and a metric for reducing interference to other user devices.

Figure 6:
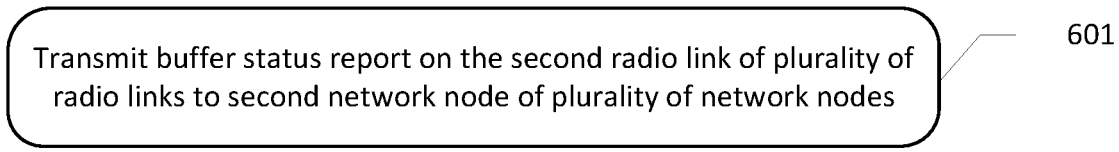

Referring to FIG. 6, further operations that can be performed by a UD (e.g., 300 in FIG. 3) having a multiple connectivity configuration with a plurality of radio links (e.g., 103) to a plurality of network nodes (e.g., 105) in a radio communication network may include transmitting (601) the buffer status report on the second radio link (e.g., 103*b*) of the plurality of radio links (e.g., 103) to the second network node (e.g., 105*b*, 105*c*) of the plurality of network nodes (e.g., 105).

Figure 7:
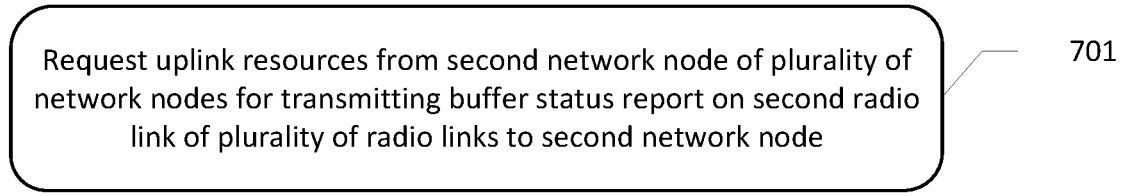

Referring to FIG. 7, further operations that can be performed by a UD (e.g., 300 in FIG. 3) having a multiple connectivity configuration with a plurality of radio links (e.g., 103) to a plurality of network nodes (e.g., 105) in a radio communication network may include requesting (701) uplink resources from the second network node (e.g., 105*b*, 105*c*) of the plurality of network nodes for transmitting the buffer status report on the second radio link (e.g., 103*b*) of the plurality of radio links to the second network node.

Figure 8:
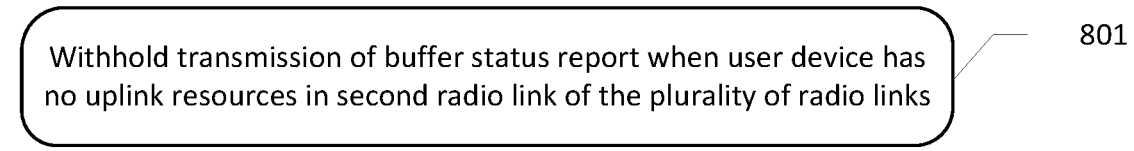

Referring to FIG. 8, further operations that can be performed by a UD (e.g., 300 in FIG. 3) having a multiple connectivity configuration with a plurality of radio links (e.g., 103) to a plurality of network nodes (e.g., 105) in a radio communication network may include withholding (801) transmission of the buffer status report when the user device has no uplink resources in the second radio link (e.g., 103*b*) of the plurality of radio links (e.g., 103).

Figure 9:
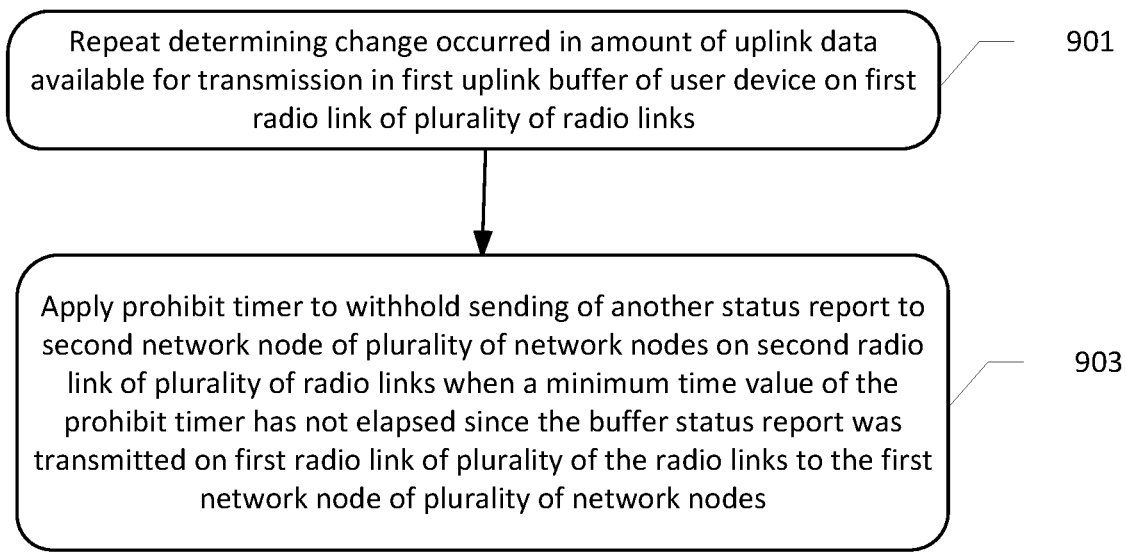

Referring to FIG. 9, further operations that can be performed by a UD (e.g., 300 in FIG. 3) having a multiple connectivity configuration with a plurality of radio links (e.g., 103) to a plurality of network nodes (e.g., 105) in a radio communication network may include repeating (901) the determining that a change occurred in an amount of uplink data available for transmission in the first uplink buffer (e.g., 109*a*) of the user device on the first radio link (e.g., 103*a*) of the plurality of radio links.

The operations may further include applying (903) a prohibit timer to withhold the sending of another status report to the second network node (e.g., 105*b*, 105*c*) of the plurality of network nodes (e.g., 105) on the second radio link (e.g., 103*b*, 103*c*) of the plurality of radio links (103) when a minimum time value of the prohibit timer has not elapsed since the buffer status report was transmitted on the first radio link (e.g., 103*a*) of the plurality of the radio links to the first network node (e.g., 105*a*) of the plurality of network nodes.

Figure 10:
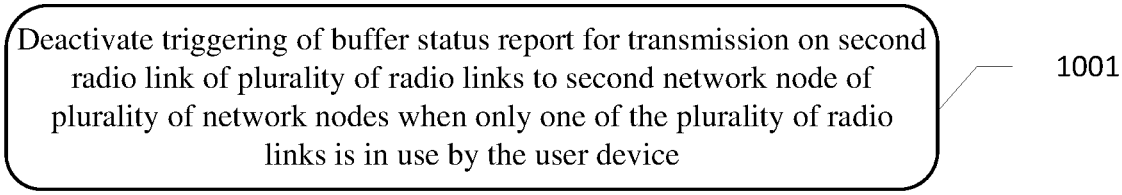

Referring to FIG. 10, further operations that can be performed by a UD (e.g., 300 in FIG. 3) having a multiple connectivity configuration with a plurality of radio links (e.g., 103) to a plurality of network nodes (e.g., 105) in a radio communication network may include deactivating (1001) the triggering of a buffer status report for transmission on the second radio link (e.g., 103*b*, 103*c*, etc.) of the plurality of radio links to the second network node (105*b*, 105*c*, etc.) of the plurality of network nodes when only one of the plurality of radio links is in use by the user device.

Operations of a network node (implemented using the structure of the block diagram of FIG. 4) will now be discussed with reference to the flow charts of FIGS. 11-12 according to some embodiments of inventive concepts. Each of the operations described in FIGS. 11-12 can be combined and/or omitted in any combination with each other, and it is contemplated that all such combinations fall within the spirit and scope of this disclosure.

Figure 11:
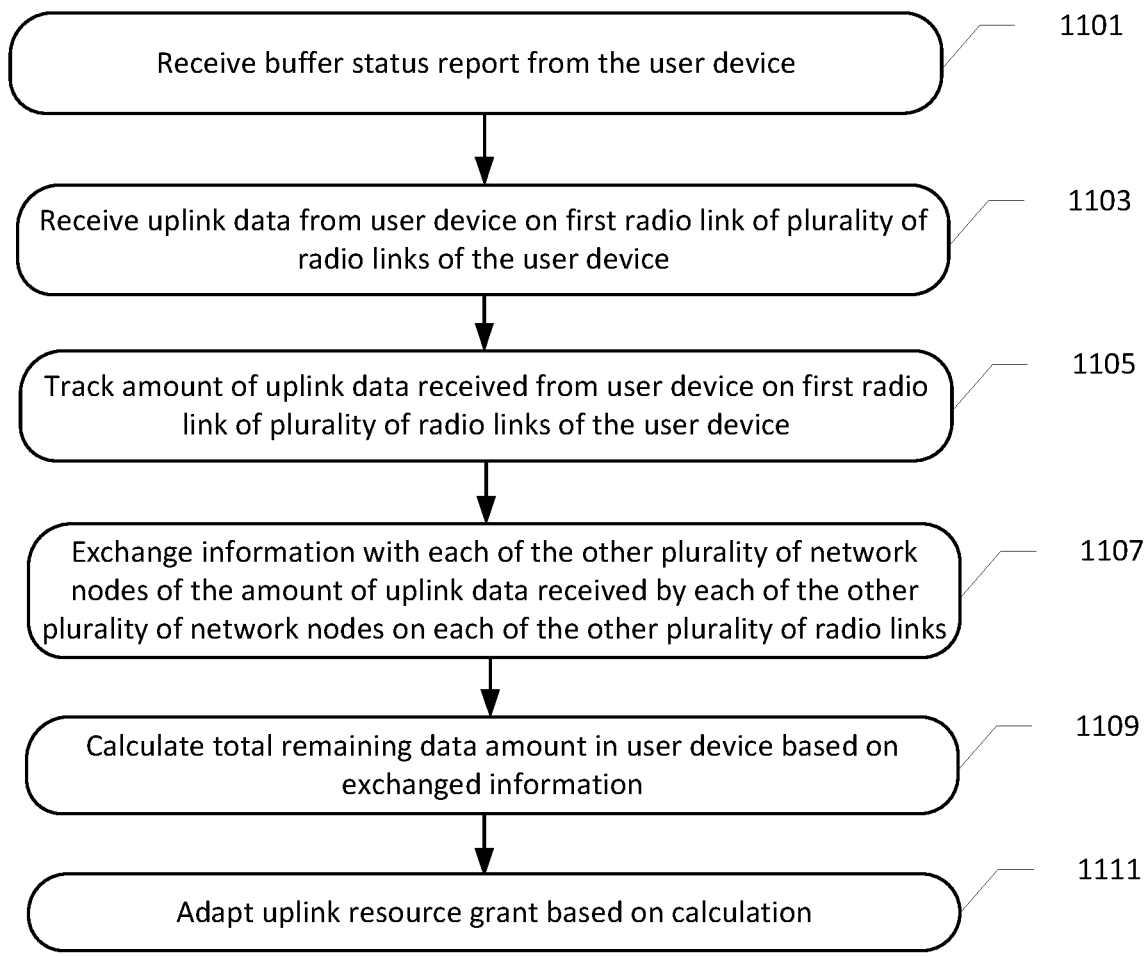
FIGS. 11-12 are flowcharts illustrating operations that may be performed by a network node in accordance with some embodiments of the present disclosure.

Referring initially to FIG. 11, operations can be performed by a first network node (e.g., 400) connected to a user device (e.g., 101, 300) having a multiple connectivity configuration with a plurality of radio links (e.g., 103) to a plurality of network nodes (e.g., 105) in a radio communication network. The operations include receiving (1101) a buffer status report from the user device. The buffer status report includes an uplink data amount available for transmission in the user device. The operations further include receiving (1103) uplink data from the user device on a first radio link (e.g., 103*a*) of the plurality of radio links (e.g., 103) of the user device (101). The operations further include tracking (1105) the amount of uplink data received from the user device on the first radio link (e.g., 103*a*) of the plurality of radio links (e.g., 103) of the user device. The operations further include exchanging (1107) information with each of the other of the plurality of network nodes (e.g., 105) of the amount of uplink data received by each of the other of the plurality of network nodes on each of the other plurality of radio links (e.g., 103) from the user device. The operations further include calculating (1109) a total remaining data amount in the user device based on the exchanged information. The operations further include adapting (1111) an uplink resource grant based on the calculation.

Figure 12:
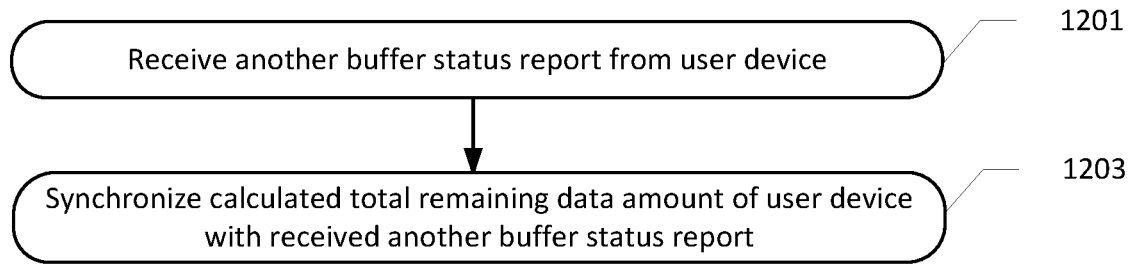

Referring to FIG. 12, further operations that can be performed by a first network node (e.g., 400) connected to a user device (e.g., 101, 300) having a multiple connectivity configuration with a plurality of radio links (e.g., 103) to a plurality of network nodes (e.g., 105) in a radio communication network may include receiving (1201) another buffer status report from the user device. The operations may further include synchronizing (1103) the calculated total remaining data amount of the user device with the received another buffer status report.

In some embodiments, the exchanging information with each of the other of the plurality of network nodes is exchanged using an X2 protocol.

Aspects of the present disclosure have been described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Claims are provided below. Reference numbers/letters are provided in parenthesis by way of example/illustration without limiting example embodiments to particular elements indicated by reference numbers/letters.

The invention claimed is:

1. A method performed by a first network node connected to a user device having a multiple connectivity configuration with a plurality of radio links to a plurality of network nodes in a radio communication network, the method comprising:
    receiving a buffer status report from the user device, the buffer status report comprising an uplink data amount available for transmission in the user device;
    receiving uplink data from the user device on a first radio link of the plurality of radio links of the user device;
    tracking the amount of uplink data received from the user device on the first radio link of the plurality of radio links of the user device;
    exchanging information with each of the other of the plurality of network nodes of the amount of uplink data received by each of the other of the plurality of network nodes on each of the other plurality of radio links from the user device;
    calculating a total remaining data amount in the user device based on the exchanged information; and
    adapting an uplink resource grant based on the calculation.

2. The method of claim 1, further comprising:
    receiving another buffer status report from the user device; and
    synchronizing the calculated total remaining data amount of the user device with the received another buffer status report.

3. The method of claim 1, wherein the exchanging information with each of the other of the plurality of network nodes is exchanged using an X2 protocol.

4. A network node configured to operate with a user device having a multiple connectivity configuration with a plurality of radio links to a plurality of network nodes in a radio communication network, the network node comprising:
    at least one processor; and
    a memory coupled with the at least one processor, wherein the memory includes instructions that when executed by the at least one processor causes the network node to:
        receive a buffer status report from the user device, the buffer status report comprising an uplink data amount available for transmission in the user device;
        receive uplink data from the user device on a first radio link of the plurality of radio links of the user device;
        track the amount of uplink data received from the user device on the first radio link of the plurality of radio links of the user device;
        exchange information with each of the other of the plurality of network nodes of the amount of uplink data received by each of the other of the plurality of network nodes on each of the other plurality of radio links from the user device;
        calculate a total remaining data amount in the user device based on the exchanged information; and
        adapt an uplink resource grant based on the calculation.

* * * * *